United States Patent [19]

Fischer et al.

[11] Patent Number: 5,676,510
[45] Date of Patent: Oct. 14, 1997

[54] PLATE FOR ANCHORING COMPONENTS TO A SHEET METAL STRUCTURE

[76] Inventors: John D. Fischer, 11525 S. Shoemaker Ave., Santa Fe Springs, Calif. 90670; Pierino Garnero, Via Rivoli, 55, 10090-Rosta-(Torino), Italy

[21] Appl. No.: 542,837

[22] Filed: Oct. 13, 1995

[30] Foreign Application Priority Data

Oct. 17, 1994 [IT] Italy .................. TO94A0819

[51] Int. Cl.$^6$ .............. F16B 27/00; F16B 37/06
[52] U.S. Cl. .................. 411/84; 411/104; 411/171; 411/282
[58] Field of Search ............... 411/84, 104, 171, 411/183, 281, 282, 85

[56] References Cited

U.S. PATENT DOCUMENTS

| | | | |
|---|---|---|---|
| 2,286,982 | 6/1942 | Todd | 411/282 |
| 5,118,234 | 6/1992 | Norkus | 411/104 X |
| 5,193,643 | 3/1993 | McIntyre | 411/104 X |
| 5,393,164 | 2/1995 | Renner et al. | 411/171 X |

*Primary Examiner*—Neill R. Wilson
*Attorney, Agent, or Firm*—George J. Netter

[57] ABSTRACT

An anchor plate (1A) has threaded sleeves (2) for mounting equipment to a sheet metal structure (5). The plate and metal structure (5) are configured to conform to one another on assembly for structure reinforcement. An elastic tongue (10, 16) integral with the plate (1A) carries a rivet (9) which contacts the structure (5) during assembly and the two in predetermined orientation during welding of the rivet (9) to the structure.

8 Claims, 5 Drawing Sheets

5,676,510

PLATE FOR ANCHORING COMPONENTS TO A SHEET METAL STRUCTURE

BACKGROUND

1. Field of the Invention

This invention concerns a plate to anchor components on a metal sheet, including threaded sleeves obtained from a stamping of a single part with the plate, to take up fixing screws of those components; this plate is constituted of metal having hardness from 40 to 50 Rockwell "C", these sleeves having an enlarged end portion near the plate and an internal threading that is obtained by rolling. Before a hardening operation on the plate, the sleeves have their extreme edge farther from the plate radially deformed by rolling, so that first coils of the threading are oval, to guarantee a self-locking effect.

2. Description of Related Art

An anchoring plate of the general kind we are concerned with here is described and illustrated in European patent No. 333,953 owned by applicant. In many applications, particularly for the car industry, it is necessary to screw components to a sheet metal structure, typically a part of a motor vehicle body, that does not have a thickness that permits to obtain a threading long enough for screws guaranteeing link safety. In the past, this problem has been solved employing an anchoring plate affixed to a vehicle structure. These plates had a thickness enabling threading long enough to guarantee a safe link of the components, and were constituted of a relatively low hardness material to permit employing a self-locking bolt. Due to the relatively high weight of those plates and due to the high cost of self-locking bolts, this approach was not a satisfactory solution to the problem.

Another solution not completely satisfactory consisted in employing conventional threaded (hexagonal or circular) nuts, spot-welded onto sheet metal plates. Difficulties met with this latter kind of anchoring plate consist in welding points breaking with possibility of rotation of one or more nut screws in the bolt fastening.

To avoid disadvantages of conventional technology above described, it is proposed in European patent No. 333,953, above mentioned, an anchoring plate of the kind already referenced. Following this solution, a plate is obtained starting from a relatively thin rough plate of a medium hardness steel, that is treated by a progressive die to form anchoring sleeves on the plate itself. In this way sufficiently long sleeves are produced to permit shaping of an appropriate thread, without needing a relatively thick plate. The threading of each sleeve is accomplished by rolling, followed by a hardening operation, so that the finished part is lighter and more resistant than conventional plates. Furthermore, each sleeve can be rolled at the free end to ovalize sleeve threads and obtain a self-locking effect.

FIGS. 1 and 2 of the annexed drawings are perspective views showing two opposite sides of an anchoring plate following the concept of the invention described in European Patent No. 333,953. In these figures numeral 1 indicates a relatively thin plate of a hard material. In particular, plate 1 is a carbon steel 1050 having a Rockwell hardness from 40 to 50. Plate 1 still can be treated by known thermic hardening procedures. Maintaining the same hardness, it is possible to have a low plate thickness and so obtain a lower weight in comparison to traditional anchoring plates. For example, a plate like the one shown in FIGS. 1 and 2 could be produced from an initial 1.6 mm. thickness semi-finished product.

Next, a progressive die operation is performed on the semi-finished product obtaining required sleeves 2 extending perpendicular to the plate main surface. By employing a progressive die it is possible to make longer sleeves than the conventional extruded ones. In a practical application, starting from a 1.6 mm. thickness plate, sleeves of 6.3 mm. have been obtained. Each sleeve 2 has an enlarged portion end 3 near the plate 1, all sleeve parts and base plate being unitary. Inside each sleeve 2 there is a rolled thread to receive anchor screws. Rolling threads is advantageous because it can be done on a thinner sleeve in comparison to what it is possible to do with a traditional threader or self-tapping screw. Also, rolling does not produce scraps that have to be eliminated.

After thread shaping, the free end 4 is additionally rolled to effect ovalization on first threads encountered by a screw entering the sleeve. This produces a self-locking effect against unscrewing. The final phase consists in a hardening treatment, so that a lighter, more resistant, more reliable part results in comparison to traditional anchoring plates and the risk of thread deterioration due to bolt screwing is avoided.

SUMMARY OF THE INVENTION

A primary object of this invention is to improve anchoring plates of the European patent above mentioned, so that it will be possible to utilize them not only to anchor components, but also as a stiffening item for the structure to which they are linked. To achieve this object, the invention concerns a plate to anchor components to a sheet steel structure, with stamped sleeves for receiving screws to fasten these components and the sleeves have their ends spaced from the plate radially deformed by rolling, so that first threads are oval to achieve a self-locking effect. The plate has a complex shape, with some portions not on the same plane, made to be affixed to and conform to corresponding portions of a sheet metal structure, so that it can contribute to the resistance of this sheet metal structure as well. In areas some distance from anchoring screws, these non-coplanar portions include rivets, weldable on sheet wall metal structure corresponding portions that are backward in comparison to the contact surface between the corresponding portion of the anchoring plate and the corresponding portion of the sheet metal structure, to enable plate positioning on the sheet metal structure before welding.

In one embodiment, these rivets are included in the plate with flexibility enabling small positional adjustments. For example, rivets are placed in an elastic portion of the plate.

In another embodiment, rivets are carried by an elastic tongue secured to the plate. In yet another embodiment, rivets are carried by a dial made of elastic tongues unitarily secured to the plate. In a third solution, rivets are mounted on a lifted portion, bridgewise, of the plate. In another example, rivets are slidingly located in a plate hole.

In yet another embodiment, non-coplanar portions of the plate have one or more elastic tongues to snap into the sheet metal structure corresponding openings to stiffly link the plate to the structure.

In the above mentioned embodiments, the anchoring plate of the invention besides having characteristic functions of the plate described in the European patent, is now employed as a stiffening element for the overall structure, to increase resistance of the structure remote from the anchoring screws.

BRIEF DESCRIPTION OF THE DRAWING

Further characteristics and advantages of this invention will be in the following description referring to the annexed drawings given here only as a non-limiting example.

DESCRIPTION OF PREFERRED EMBODIMENTS

Figure 1:
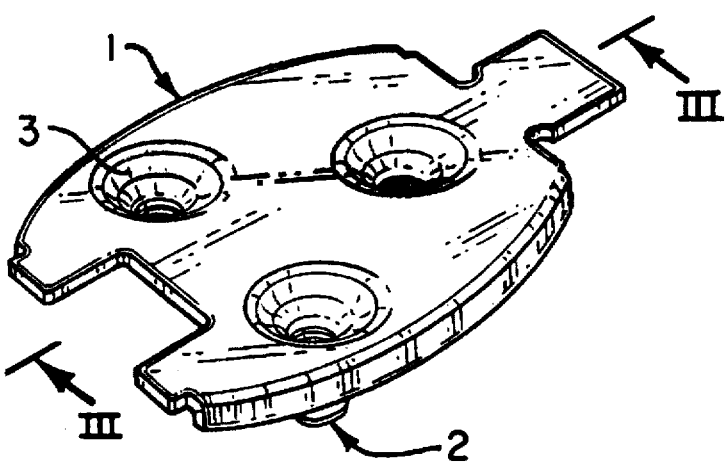
FIGS. 1 and 2 are perspective views showing opposite sides of a plate made according to the prior art.
Figure 2:
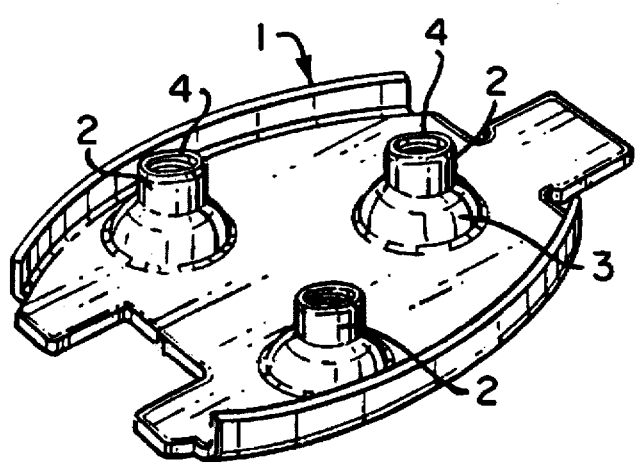
Figure 3:
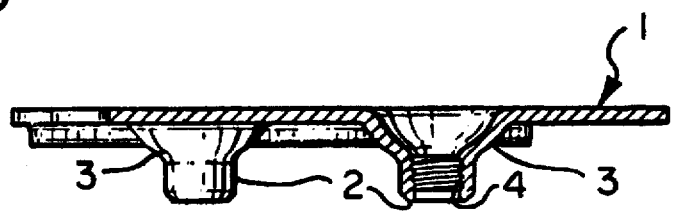
FIG. 3 is a section along line 3—3 of FIG. 1.

FIGS. 1, 2 and 3 refer to the prior technology have already been discussed earlier herein.

Figure 4:
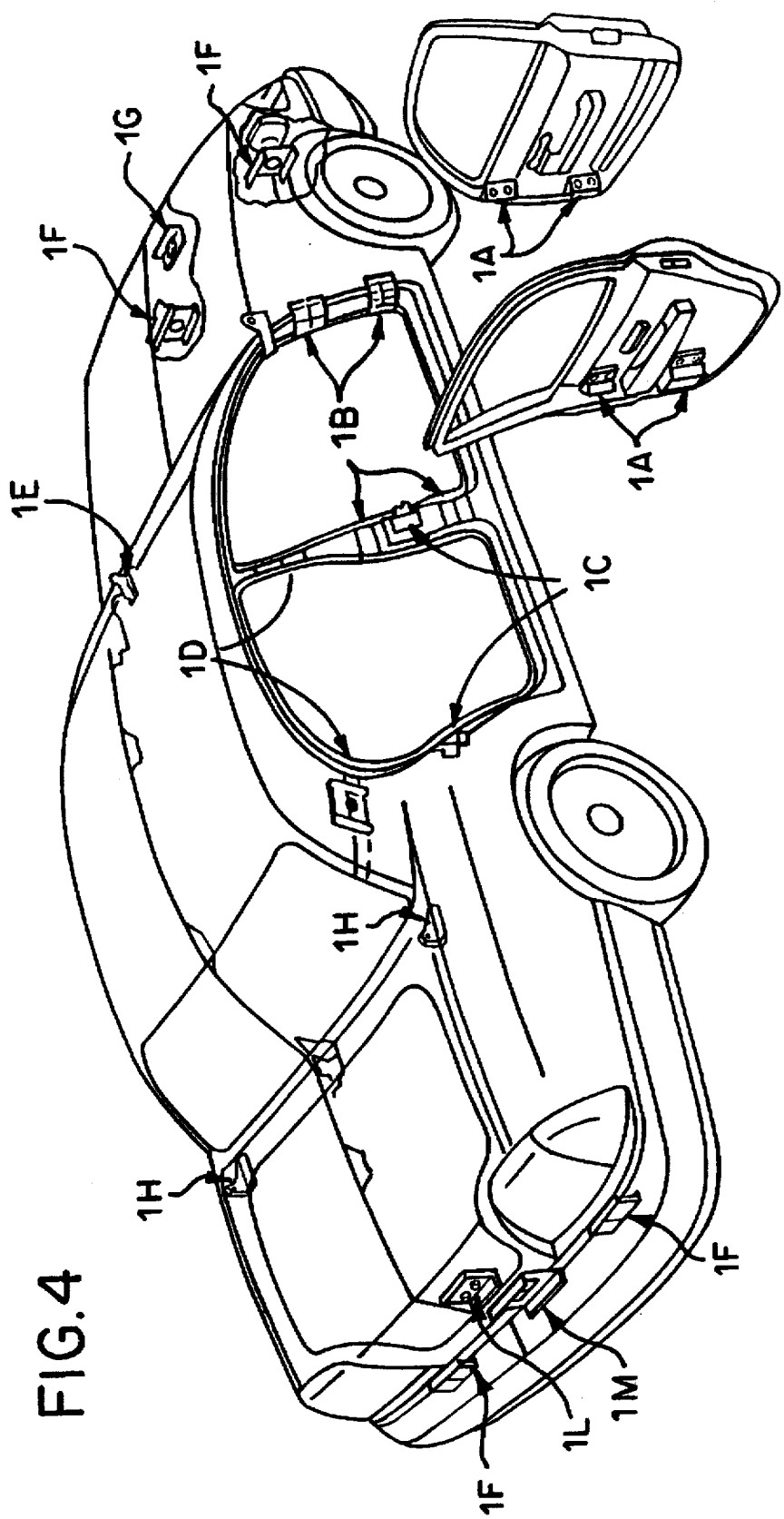
FIG. 4 is a schematic perspective view of a car showing a series of possible applications of this invention.

FIG. 4 shows a series of possible applications of reinforcement and anchoring plates made according to this invention. Reference numeral 1A indicates an enforcement plate made following this invention, applied to front and rear doors to anchor corresponding door hinges. Numeral 1B indicates anchoring plates on the body, to assemble hinge segments to the body. Numeral 1C depicts a reinforcement plate used to assemble the rear and front door striker attachments. Numeral 1D shows reinforcement plates of the invention to anchor rear and front seat belt attachments. Reinforcement plate 1E anchors hood hinge attachments and numeral 1F indicates reinforcement plates employed to anchor the front and rear bumper. Numeral 1G identifies a reinforcement plate to anchor the hood lock striker, 1H to hinge deck lid anchoring plates, and 1L and 1M anchor deck lid lock strikers. As is clearly shown by FIG. 4, the invention has a number of possible applications on the car structure, namely, wherever there is a need to anchor some components to the car body in a reliable and safe way, and, at the same time, there is a further need to stiffen the structure without increasing weight significantly.

Figure 5:
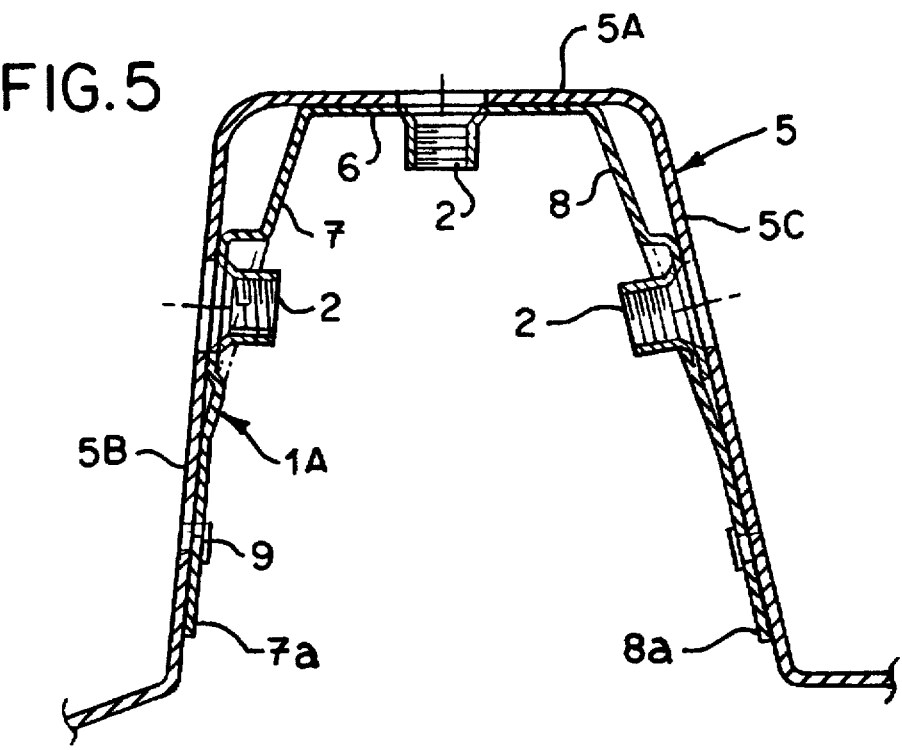
FIG. 5 is a sectional view of a first form of accomplishment of a plate following the invention in assembled condition.

FIG. 5 shows a first embodiment of the invention, referring to reinforcement plates marked as 1A in the FIG. 4 that concerns anchoring of a hinge element to the car door. In FIG. 5 reference numeral 5 indicates a section of a pillar in the stamped sheet metal door structure that has a generally "U" shape, with a central side 5A, and two lateral sides 5B and 5C.

On the interior side of the door, pillar 5 structure is stiffened with the plate 1A of the kind of this invention, that has a conforming "U" shape, with a central side 6 that matches the central side of the door pillar, and two lateral sides 7 and 8 that have end portions 7a and 8a matching corresponding portions 5B and 5C of the door pillar. Plate 1A has internally directed threaded sleeves 2, made following technology of FIGS. 1–3 covered by European Patent No. 333,953. These sleeves are employed for receiving screws that fix hinge door elements onto door structure. As already mentioned, in that manner it is possible to obtain a safe anchoring between hinges and doors. As a result of sleeves 2 axial extension, the anchor plate can be made without increasing the structure weight since thickness of anchoring plate 1A can be maintained relatively small. Still referring to FIG. 5, the fastening of plate 1A to pillar 5 is accomplished by welding rivets 9 that are carried by anchoring plate 1A and are made of a steel weldable to pillar 5 sheet metal.

A problem arises from the condition that the plate has non-coplanar portions that have to match with corresponding portions of the structure that it is desired to stiffen. If there are differences in dimensions and construction between the plate 1 and pillar 5, the plate will not seat (i.e., will leave one or more gaps) within the pillar without some compensation being made. The present invention solves this problem by mounting rivets 9 on a resilient member which readily flexes to allow full mating of the plate within a receiving pillar both before and after welding.

Figure 6:
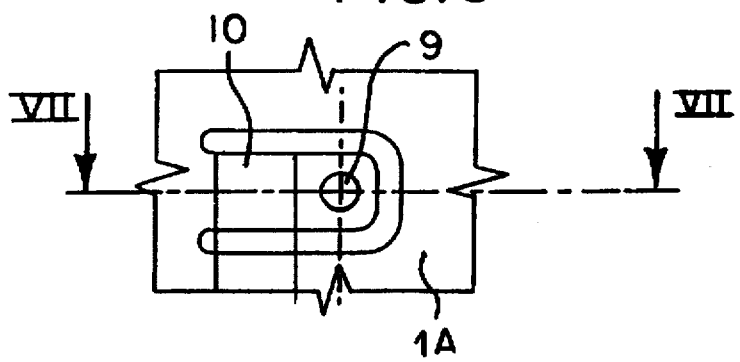
FIGS. 6 and 7 are frontal view of a FIG. 5 plate and detail sectional view.
Figure 7:
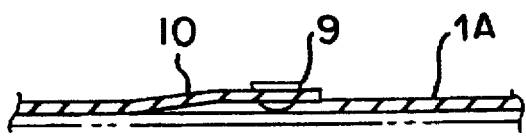
Figure 8:
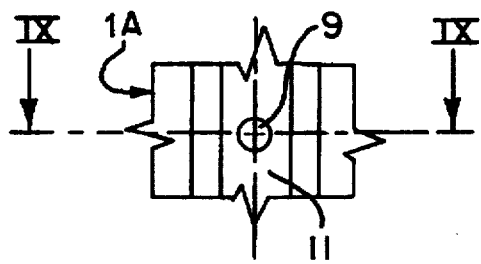
FIGS. 8–9, 10–11 and 12–13 depict frontal views of three further embodiments with accompanying elevational sectional views of each.
Figure 9:
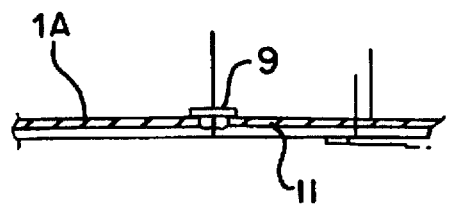

To satisfy the above mentioned condition, each rivet 9 has following examples in FIGS. 6 and 7, a resilient tongue 10 trimmed from the side of reinforcement plate 1A and shaped to maintain rivet 9 in contact with the opposed fitting surface of the structure 5 portion. In that manner, the U plate can be fully positioned in the U section of structure 5 since the tongues 10 flex when the rivets 9 contact sides 5B and 5C. After that, rivets 9 are welded to structure 5 by a welding gun whose electrodes press each rivet against a corresponding part of structure 6. In this phase, tongue 10 elasticity only permits rivet 9 to contact with that structure 5 part. FIGS. 8 and 9 show a variant in which rivet 9 is mounted to a raised portion 11 similar to the bridge of plate 1A.

Figure 10:
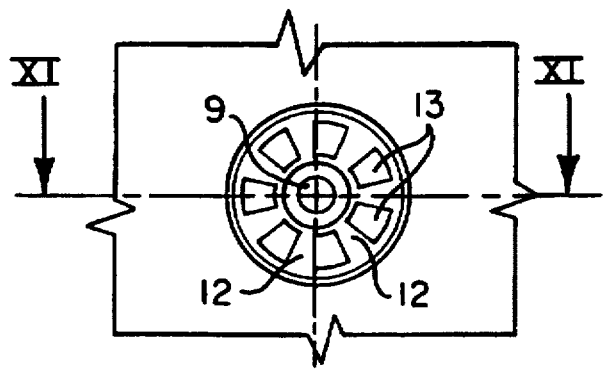
Figure 11:
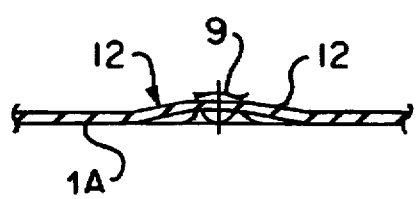
Figure 12:
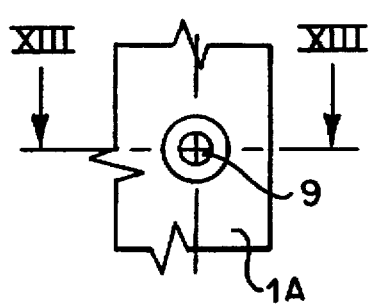
Figure 13:
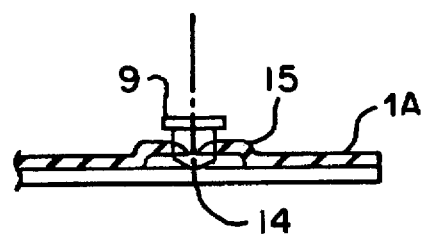
Figure 14:
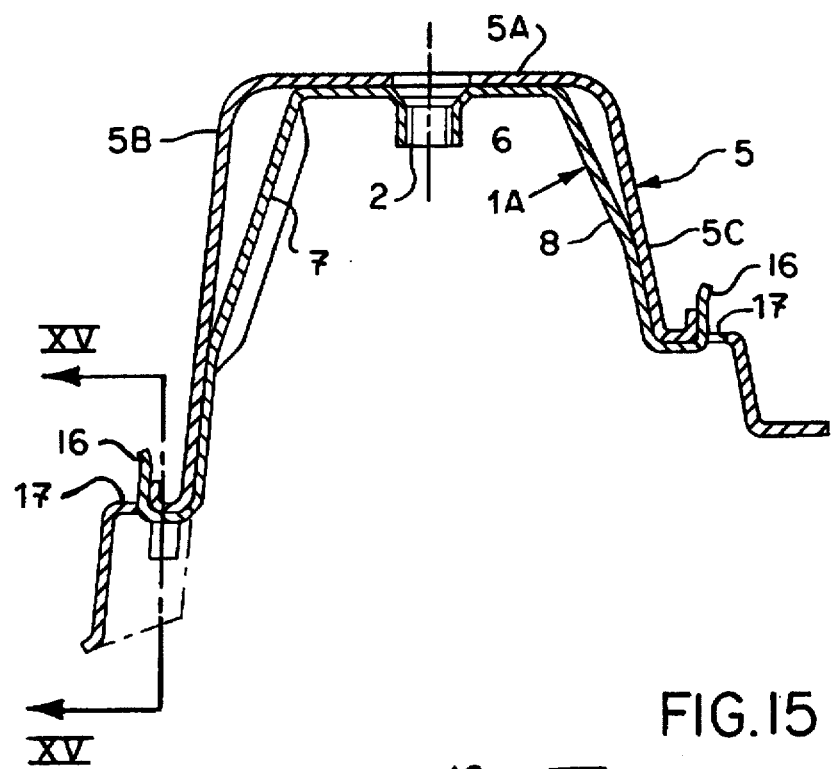
FIG. 14 is a sectional, elevational view of a still further plate embodiment.
Figure 15:
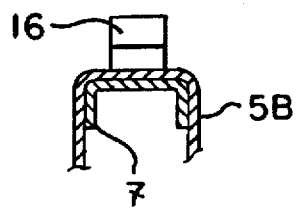
FIG. 15 is a sectional view taken along line 15—15 of FIG. 14.
Figure 16:
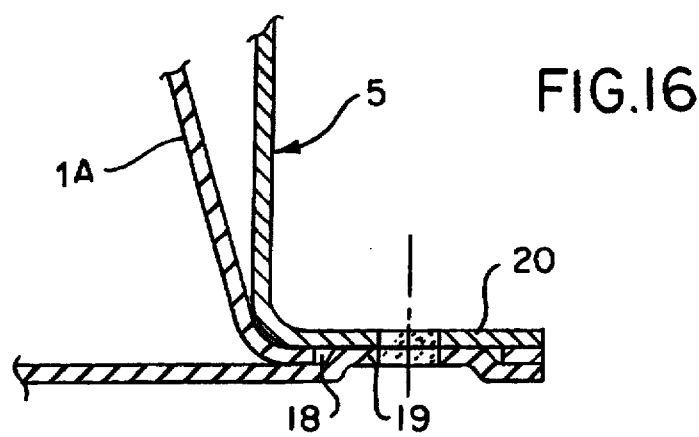
FIG. 16 is a sectional view in enlarged scale of a detail of a further variation of the plate according to the invention.

In FIGS. 10, 11 there is still another variant in which the rivet 9 is mounted onto an elastic tongue 12 with cutout portions 13 in the side of reinforcement plate 1A. FIGS. 12 and 13 show another variant in which each rivet 9 slides within a hole 14 on a raised portion 15 of the reinforcement plate side 1A. On welding to structure 5, the rivet is pushed from the welding tooling into the hole 14 to contact structure 5. FIGS. 14 and 15 show a further embodiment that differs from the one of FIG. 5 in that fastening of plate 1A to the structure is obtained by a resilient tongue 16 having end portions that snap into holes 17, the latter being achieved by cutting out from the sheet metal that constitutes structure 5. FIG. 16 depicts another variant, in which plate 1A has its extreme edge 18 punched between two metal sheet elements 19, 20 welded to each other so as to constitute structure to be stiffened.

From the above description, it is clear that the plate of this invention maintains every advantage of the plate described in European Patent No. 333,953, and, moreover, provides a structure stiffening the member to which it is fastened, not only where there are fastening screws, but also in areas somewhat remote from the screws without increasing the total weight of the structure.

Although the invention has been described in connection with preferred embodiments, it is to be understood that those skilled in the appertaining arts may contemplate changes that come within the spirit of the described invention and within the ambit of the appended claims.

What is claimed is:

1. Plate to anchor components on a sheet metal structure having stamped threaded sleeves for receiving screws therein, said plate constructed of a steel having hardness between 40 to 50 Rockwell "C", the sleeves having an enlarged portion near the plate and a rolled internal threading comprising:

the plate having non-coplanar portions made to match and to be fastened to corresponding metal sheet structure portions to contribute to the resistance of this metal sheet structure in areas remote from screws, the non-coplanar portions of the plate including flexible members having rivets for welding onto corresponding sheet metal structure portions which rivets resiliently contact said corresponding sheet metal structure portions to enable proper positioning of the plate onto the sheet metal structure before welding.

2. Plate as in claim 1, in which certain of the sleeve threads are out-of-round.

3. Plate as in claim 1 in which the rivets and flexible members are mounted on the plate with the capability of relative movement with respect to said plate.

4. Plate as in claim 3, in which end portions of said plate are slidingly received within openings formed in the sheet metal structure.

5. Plate as in claim 3, in which the rivets are mounted onto a plate elastic portion to maintain the rivet in the mentioned structure contacting position.

6. Plate as in claim 5, in which the rivets are mounted onto an elastic tongue formed from the plate.

7. Plate as in claim 5, in which each rivet is mounted onto the central part of a dial formed in the plate material by removing materials at a plurality of spaced apart locations about said rivet.

8. Plate as in claim 5, in which each rivet is mounted onto a portion of the plate material which is raised above the general plane of the remainder plate material.

* * * * *